(12) United States Patent
Lewis

(10) Patent No.: US 7,600,767 B2
(45) Date of Patent: Oct. 13, 2009

(54) DOLLY FOR MOVING LARGE AND HEAVY OBJECTS

(76) Inventor: Carl Lewis, 9451 Fairbanks Ave., San Diego, CA (US) 92123

( * ) Notice: Subject to any disclaimer, the term of this patent is extended or adjusted under 35 U.S.C. 154(b) by 296 days.

(21) Appl. No.: 11/655,029

(22) Filed: Jan. 18, 2007

(65) Prior Publication Data
US 2008/0174080 A1 Jul. 24, 2008

(51) Int. Cl.
 B62B 3/10 (2006.01)
(52) U.S. Cl. .................................. 280/79.7; 280/79.11
(58) Field of Classification Search .............. 280/79.11, 280/79.7, 87.042
See application file for complete search history.

(56) References Cited

U.S. PATENT DOCUMENTS

| | | | | |
|---|---|---|---|---|
| 2,805,078 A | * | 9/1957 | Robinson | 280/79.11 |
| 3,105,698 A | * | 10/1963 | Bonarrigo et al. | 280/47.131 |
| 3,306,624 A | * | 2/1967 | Goss | 280/47.34 |
| 3,411,802 A | * | 11/1968 | Milton | 280/79.11 |
| 3,476,399 A | * | 11/1969 | Finn | 280/11.25 |
| 3,717,357 A | * | 2/1973 | Schaefer | 280/35 |
| 3,720,422 A | | 3/1973 | Nelson | |
| 3,771,811 A | * | 11/1973 | Bueno | 280/87.042 |
| 4,160,554 A | * | 7/1979 | Cooney | 280/87.042 |
| 4,270,741 A | * | 6/1981 | Hurst | 269/17 |
| 4,699,391 A | * | 10/1987 | Syring | 280/79.11 |
| D310,894 S | * | 9/1990 | Smith | D34/23 |
| 5,044,645 A | | 9/1991 | Eltvik | |
| 5,048,850 A | * | 9/1991 | McDonald | 280/47.131 |
| 5,184,446 A | * | 2/1993 | Gustavsen | 52/746.1 |
| D340,337 S | * | 10/1993 | Beasley | D34/23 |
| 5,284,410 A | * | 2/1994 | Sare et al. | 414/11 |
| 5,318,316 A | * | 6/1994 | Shurtleff | 280/79.7 |
| 5,378,103 A | * | 1/1995 | Rolnicki et al. | 414/10 |
| 5,486,014 A | * | 1/1996 | Hough | 280/79.11 |
| 5,580,074 A | * | 12/1996 | Moreno | 280/79.11 |
| 5,927,731 A | * | 7/1999 | Clarke | 280/79.7 |
| 6,234,499 B1 | * | 5/2001 | Irwin et al. | 280/63 |
| 6,866,274 B1 | * | 3/2005 | Muscat | 280/79.7 |
| 6,880,836 B2 | * | 4/2005 | Kawensky | 280/79.11 |
| 7,059,613 B2 | * | 6/2006 | Farrelly et al. | 280/11.27 |
| 7,207,578 B2 | * | 4/2007 | Shore | 280/79.7 |
| 7,350,621 B2 | * | 4/2008 | Abraham | 182/129 |
| 2001/0038185 A1 | * | 11/2001 | DeNoble et al. | 280/79.11 |
| 2006/0097468 A1 | * | 5/2006 | Sugrue | 280/79.11 |

* cited by examiner

Primary Examiner—Jeffrey J Restifo
(74) Attorney, Agent, or Firm—Andrew Schroeder; Law Office of Andrew Schroeder

(57) ABSTRACT

A dolly apparatus for moving or retaining objects comprising: at least one dolly, the dolly comprising a chassis, a plurality of rollers, at least two axles, and an elongate member. The chassis comprises a first side and a second side, an anterior end and a posterior end, at least four axle retaining members, at least two walls defining a gondola channel for the elongate member.

The first side comprises a gondola channel which is defined by a first wall and a second wall. The gondola channel has a front end and a rear end. The front end of the gondola channel abuts with the first wall and the rear end abuts with the second wall.

8 Claims, 4 Drawing Sheets

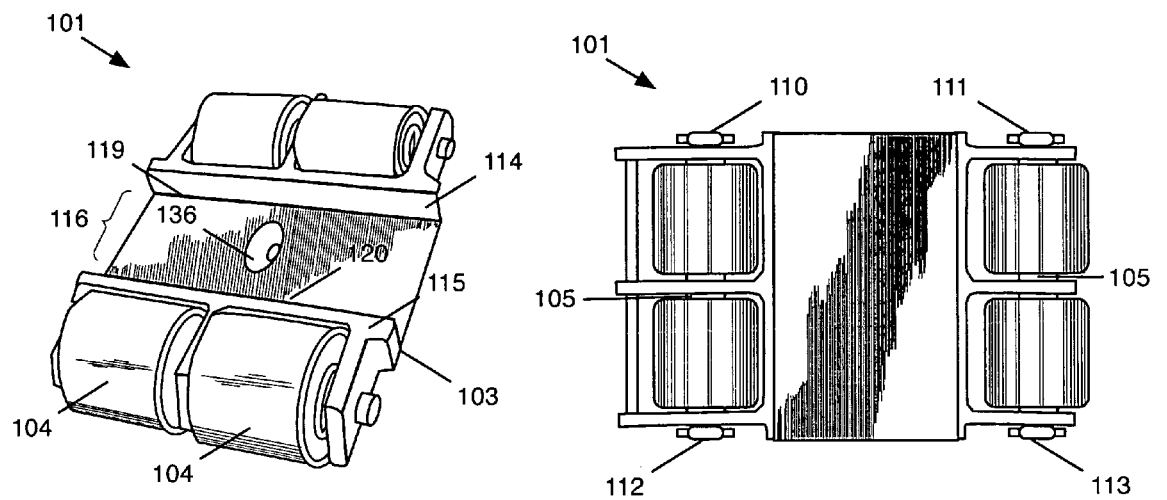
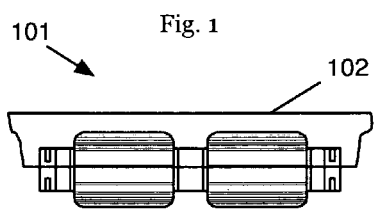
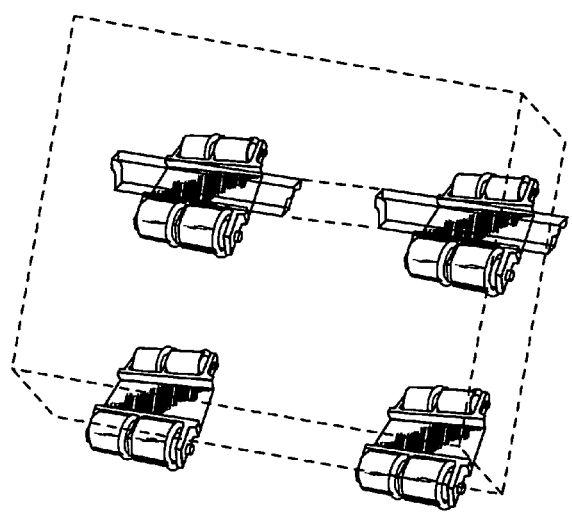
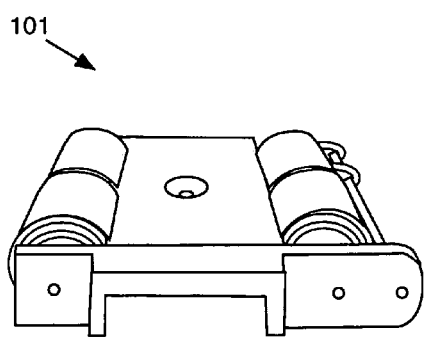
Fig. 1
Fig. 2
Fig. 3
Fig. 4
Fig. 5
Fig. 6

DOLLY FOR MOVING LARGE AND HEAVY OBJECTS

FIELD OF THE INVENTION

The present invention relates with devices for moving large and heavy objects, and pertains more specifically to dollies for the purpose of retaining, moving, and transporting large and heavy objects.

BACKGROUND OF THE INVENTION

There are several problems, dangers, and risks associated with the movement, transportation, and re-positioning of large objects such as heavy machinery. One problem is that oftentimes large machinery weighing over 10,000 pounds are situated in rooms which do not allow enough clearance area for a forklift or several forklifts. Another problem is that many large machines are too fragile to be moved solely by a forklift or by several forklifts. For this reason, a forklift may be used on one end of the machinery while being suspended by a dolly on the opposite end. And further encumbering the transport are cracks in the floor, uneven ground, grates, and other debris.

Another problem accompanied by the use of most dollies is the fact that most of them are simply raised too high off the ground. This raised profile increases the chances of inadvertently tipping the machinery over on its side. Or, in other instances, this raised profile of the dolly will lend itself to unnecessary instability. Unstable dollies become a significant source of liability in the transport of large and heavy machinery. Many large machines will incur substantial damage when dropped more than five inches off the ground. This instability creates unnecessary exposure for a moving and transportation business. It also creates substantial risk to the owner of the machinery inasmuch that the machinery is very expensive to fix and the fact that his or her business may have to shut down until the machinery is fixed.

Another problem which inheres into the task of moving large and heavy objects is the physical strain and back-breaking work entailed with lifting heavy objects. Although jacks and forklifts are used to enable much of the work, there are still several tasks which do require a substantial amount of physical strain by the human operators. This strain is not mitigated by the unnecessarily heightened profile of many dollies or other moving equipment.

Therefore, what is clearly needed in the art is an apparatus and system for the purpose of moving large and heavy objects such as machinery. This apparatus and system should minimize the potential damage to the machinery by lowering the height or profile of the dolly apparatus. The apparatus should also provide for an improved connection between the dolly apparatus and the object which it is supposed to move. The apparatus and system should also provide a more stable base for the transport of the machinery as well.

SUMMARY OF THE INVENTION

It is an object of the present invention to overcome the deficiencies and shortcomings of the prior art and provide an apparatus/system which minimizes potential damage frequently encountered when moving heavy machinery or other objects. Such apparatus or system should do this by positioning the object as close to the ground as possible while enabling free and suitable movement of the object. The closer to the ground the object is positioned will consequently minimize the potential damage if the object were to drop. Moreover, by positioning the object closer to the ground less lifting will be needed by the operator thereby eliminating the attendant risk of injury to the operator and any damage to the object to be lifted.

It is an object of the present invention to provide a scaleable system comprised of several dollies in order to carry very large and heavy machinery. This system should enable the present invention to be adaptable to any size, configuration, or weight an object poses to a person responsible for moving the object. Moreover, the dollies of the present invention are also scalable inasmuch that they may incorporate a larger chassis along with accompanying numbers of rollers (i.e. 2, 4, 6, 8, etc., and possibly odd numbered dollies as well). The present invention is also scalable with respect to the variable height at which it may position an object vertically. By using a graduated set of elongated members with varying thicknesses, the vertical positioning of the object may be adjusted with relative precision.

It is also an object of the present invention to eliminate the need for excessively positioning the object unnecessarily high thereby increasing the chances of damage should the dolly will slip out from under the object. One of the main risks to moving a large object or machinery is when a dolly or dollies (or other apparatus or system) slips out from underneath the object. By lowering the object closer to the ground there is less likelihood that the dolly or dollies will slip out from underneath the object and the consequential damage entailed thereby.

It is a further object of the present invention to provide an improved apparatus and/or system which provides increased frictional resistance between the dolly and the object to be moved. Oftentimes, large machinery are covered in oil and other substances which create slippage between the object to be moved and the dolly or dollies. Increased frictional resistance provides a more secure connection between the dolly and the object. This improved connection becomes critical when negotiating the objects over various obstacles such as cracks, uneven ground, grates, and other debris.

It is a further object of the present invention to provide an apparatus and system which will minimize the distance one must raise the machinery or other large and heavy object for placement on top of the dolly. By minimizing this distance for raising, the amount of strain and work on the operator is minimized. More importantly, by lowering the distance to raise the large and heavy object the risk of damage of dropping the machinery or tipping over the machinery is minimized.

It is a further object of the present invention to provide more stability to the dolly apparatus. Whereas in many prior art the platforms of the dollies are positioned higher the dollies are consequently less stable, the present invention incorporates more stability into the dollies by equally distributing the weight of the object on both sets of lateral wheels of the dollies and through a lowered profile.

BRIEF DESCRIPTION OF THE DRAWING FIGURES

FIG. 1 is a perspective view of a preferred embodiment of the present invention.

FIG. 2 is a plan view of a preferred embodiment of the present invention.

FIG. 3 is a frontal view of a preferred embodiment of the present invention.

FIG. 4 is a side view of a preferred embodiment of the present invention.

FIG. 5 is a perspective view of a preferred embodiment of the present invention.

FIG. 6 is a perspective view of a preferred embodiment of the present invention.

DESCRIPTION OF PREFERRED EMBODIMENTS

Figure 7:
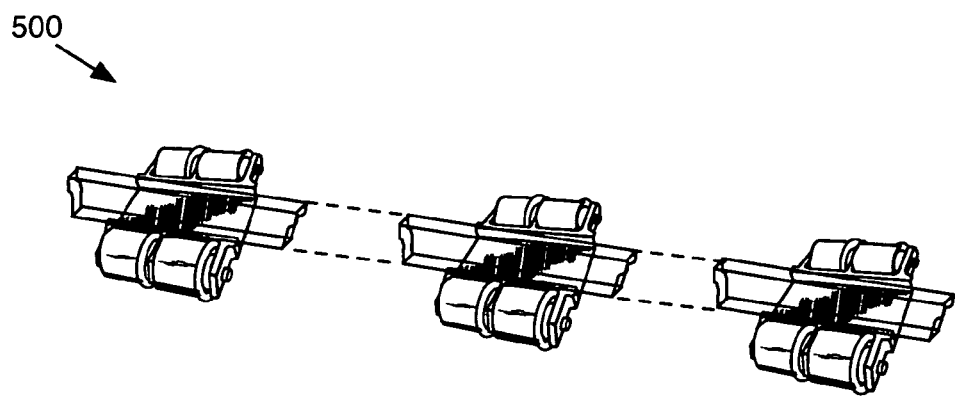
FIG. 7 is a perspective view of a preferred embodiment of the present invention.

According to a preferred embodiment of the present invention, a unique system, and apparatus is used to move large objects safely with minimized hazards to the persons using the present invention. The present invention also minimizes potential damage to the objects to be moved. The present invention is described in enabling detail below.

For the purposes of the present invention the term "gondola channel" shall mean or refer to the compartment housing or retaining the elongate member. The term gondola channel generally characterizes the lowered profile of the compartment and emphasizes the fact that the channel brings the object to be moved closer to the ground vis-á-vis the prior art. Other connotations or meanings are not within the scope of the present invention.

For the purposes of the present invention the term "machinery moving rollers" shall be interchangeable with the dolly apparatus. Any distinguishing differences with regards to components, design, etc. shall be delineated below. Other connotations or meanings are not within the scope of the present invention.

For the purposes of the present invention the term "gang" or "ganged" shall refer to the interconnected relationship between the individual dollies when they are connected by the elongate member. When the individual dollies are ganged together via the elongate member(s) they are merely joined together and act in unison as one unitary apparatus. Other connotations or meanings are not within the scope of the present invention.

For the purposes of the present invention the term "lazy susan" shall refer to the apparatus with two pivotally connected surfaces. Between the two surfaces is a means for enabling at least one of the surfaces to rotate (e.g. bearings). The term "lazy susan" is also meant to be interchangeable with the term "swivel apparatus". Other connotations or meanings are not within the scope of the present invention.

For the purposes of the present invention, the term "chassis" refers to the metal frame upon which the other components of the apparatus attach.

FIG. 1 illustrates one preferred embodiment of the present invention. The dolly system 100 comprises: at least one dolly 101 and an elongate member 102 (shown in FIGS. 3 and 4). The dolly comprises a chassis 103, a plurality of rollers 104, and at least two axles 105.

The chassis comprises a first side 106 and a second side 107, an anterior end 108 and a posterior end 109, at least four axle retaining members 110, 111, 112, and 113 respectively, and at least two walls 114, 115 defining a gondola channel 116 (illustrated in FIG. 1) for the elongate member.

The first side 106 of the chassis comprises a gondola channel 116 which is defined by a first wall 114 and a second wall 115. The gondola channel has a front end 119 and a rear end 120. The front end of the gondola channel abuts with the first wall and the rear end abuts with the second wall. The first wall abuts with the anterior axle retaining members and the second wall abuts with the posterior retaining members. Furthermore, the anterior retaining members and posterior members incorporate at least one orifice 121 for the purpose of retaining an axle. The orifices are aligned with each other for the longitudinal placement of an axle. Moreover, in some preferred embodiments the chassis further includes an orifice 136 disposed within the gondola channel. This orifice is designed for the purpose of adapting the chassis with other components such as a steering plate described below.

Figure 11A:
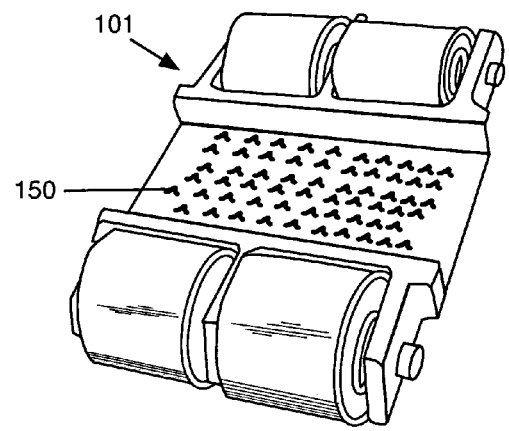
FIG. 11a is a perspective view of a preferred embodiment of the present invention.
Figure 11B:
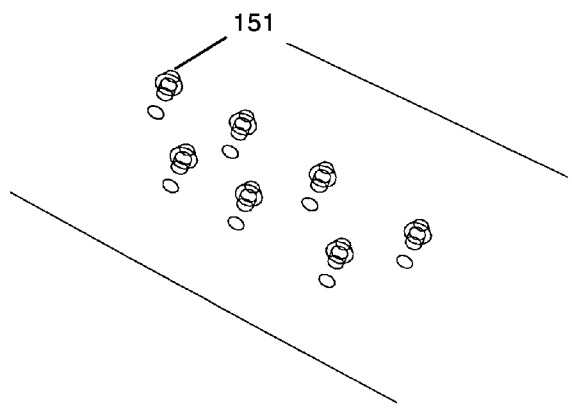
FIG. 11b is a perspective view of a preferred embodiment of the present invention.
Figure 11C:
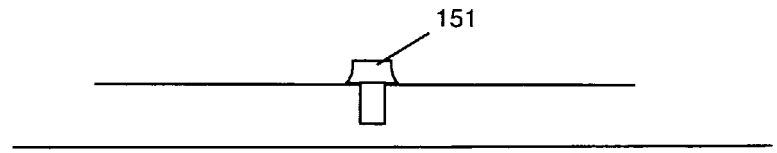
FIG. 11c is a side view of a preferred embodiment of the present invention.

FIG. 11a illustrates that the gondola channel 116 further comprises a plurality of surface protrusions 150. The surface protrusions are used for the purpose of increasing frictional resistance between the gondola channel 116 and the elongate member thereby decreasing lateral movement between the object to be moved and the dolly system. In some preferred embodiments the surface protrusions may be merely bumps, embossed grooves protruding upwards towards the elongate member. Or, alternatively in some preferred embodiments the surface protrusions are replaceable rivets 151 as illustrated in FIGS. 11b and 11c.

FIG. 6 illustrates that in some preferred embodiments the chassis is designed to be reversible 170. The reversible chassis comprises a gondola side 153 and a reversed side 154. In some instances the gondola channel and elongate member may not be suitable for the movement of some objects. In those instances the chassis can be turned upside down to use a more suitable surface for interfacing with the object to be lifted.

Figure 12:
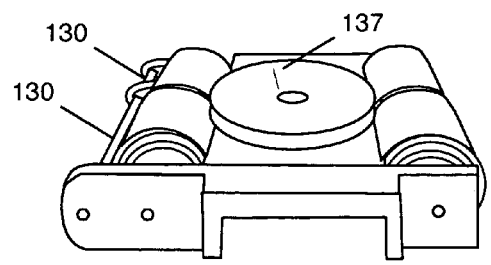
FIG. 12 is a perspective view of a preferred embodiment of the present invention.

FIG. 12 illustrates a preferred embodiment a swivel apparatus 137. The swivel apparatus comprises a swivel plate adapter for swiveling, an axle, and a retaining member. The swivel plate adapter comprises a first plate, a second plate, and bearings. Sometimes the swivel apparatus is commonly known in the art as a "lazy susan".

The first plate and the second plate are disposed on top of each other sandwiching a plurality of bearings. Or, in some other preferred embodiments, the plates may sandwich a washer. The first plate and the second plate are pivotally arranged with respect to each other. Both the first plate and the second plate further includes at least one orifice for the placement of an axle in between. The axle is longitudinally disposed through an orifice of the object to be retained or moved.

In some preferred embodiments the chassis may further incorporate at least one yoke 130. The yoke is disposed between the retaining members. The purpose of the yoke is to provide a fulcrum for a pulling or steering instrument.

Figure 9:
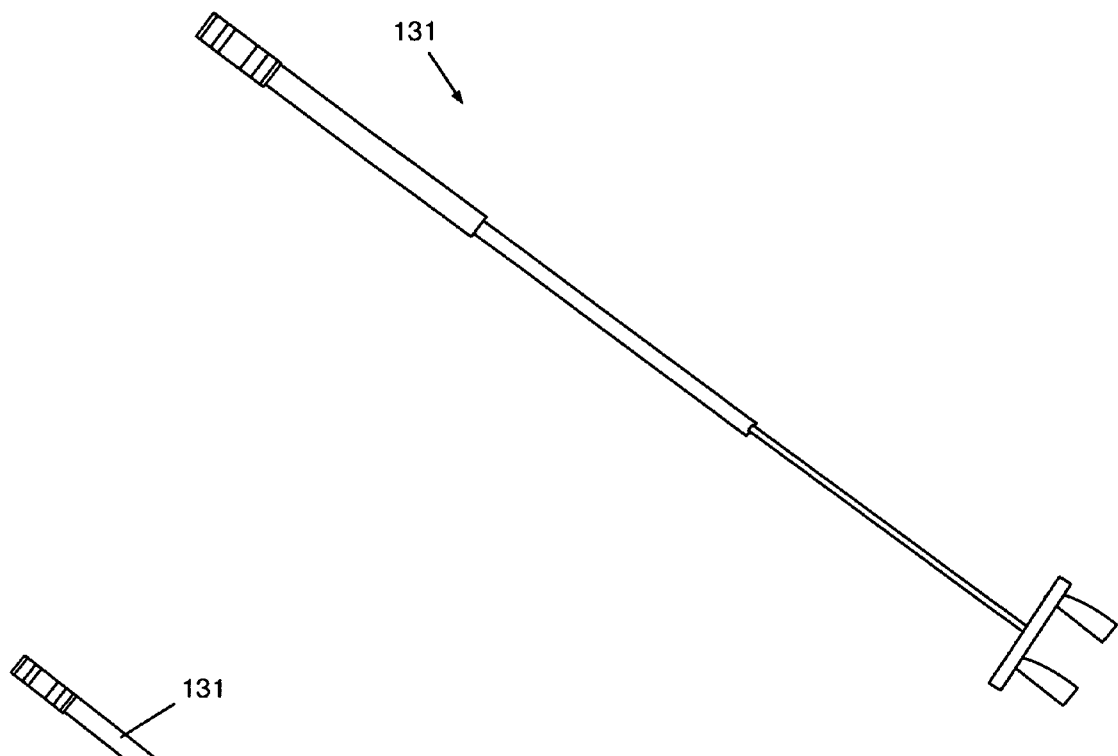
FIG. 9 is a perspective view of a preferred embodiment of the present invention.
Figure 10:
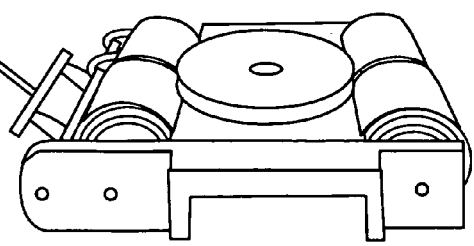
FIG. 10 is a perspective view of a preferred embodiment of the present invention.

FIGS. 9-10 illustrates a preferred embodiment wherein a steering bar 131 is incorporated into the present invention in some preferred embodiments. The steering bar has a first end 132 and a second end 133. The first end incorporates a handle 134 for a person to grip and pull. The second end 133 comprises a curved member 135 for placement around the yoke 130. And in some preferred embodiments, the steering bar may be telescopic for the purpose of being portable and compact thereby taking up less space.

The rollers are disposed between the retaining members. In some preferred embodiments the rollers are made of nylon. The reason why nylon rollers are suitable in certain situations is that they possess a relatively low amount of resistance. Nylon wheel skins provide a considerable degree of slippage which may enable an operator to move the dolly or object in a transverse direction of the rollers. However, other preferred embodiments may incorporate other rollers which are comprised of other materials. There abound a panoply of different materials and substances which may comprise the rollers. For this reason the present invention should not be construed to only require nylon rollers.

In some preferred embodiments the rollers incorporate integral bearings for the purpose of lowering the overall height of the dolly. Integral bearings are also used to provide increased strength and longevity to the apparatus.

The plurality of axles are disposed longitudinally through the rollers and the axle retaining members. In some preferred embodiments the axles are further enabled with long cylindrical bearings (i.e. needle bearings) similar to journal bearings. However, unlike journaled bearings, the long cylindrical bearings approximate the longitudinal width of the rollers. These needle bearings or long cylindrical bearings ride directly against the axle and wheel sleeve. However, other preferred embodiments may alternatively incorporate standard journaled bearings.

Figure 8:
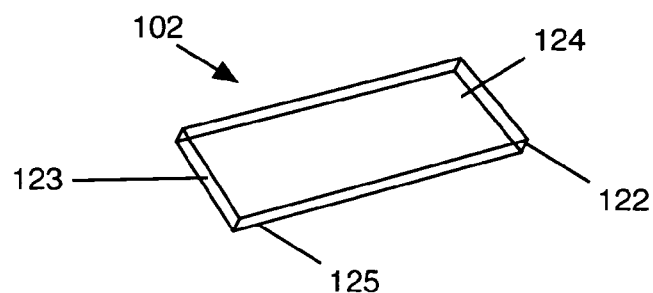
FIG. 8 is a perspective view of a preferred embodiment of the present invention.

FIG. 8 illustrates an elongate member 102 comprises a first end 122 and a second end 123, a top side 124 and a bottom side 125. The elongate member is disposed within the gondola channel between the walls. In some preferred embodiments the elongate member is made of wood. And more specifically, the elongate member is a simple 2×4" (the exact dimensions are given for illustrative purposes only, dimensions are not limiting to the scope of the present invention) wooden member.

The reason wood is an suitable material for comprising the elongate member is due to its absorptive properties. Oftentimes, heavy machinery typically required to be moved by dollies are covered with oil and other slippery substances. These slippery substances readily soak into the wood and thereby result in a more secure contact between the dolly apparatus and the object to be moved. This secure contact creates needed frictional resistance to push the object and dolly in the desired direction.

This improved non-slip supporting surface is also desirable because it is comparatively inexpensive and ubiquitous. However, those skilled in the art will understand how different elongate members can be incorporated into the present invention. For this reason, the present invention is adaptable to other elongate members as well.

FIG. 7 illustrates a preferred embodiment of the present invention. The ganged dolly system 500 comprises a plurality of dollies which are connected with each other by disposing the first end of the elongate member in the cradle of the first dolly and disposing the second end of the elongate member in the cradle of the second dolly. In those embodiments where there are more than three dollies the system further includes at least one interposed dolly disposed between the first end dolly and the second end dolly.

One of the advantages of the present invention is the scalability of the system. The present invention can be made to include many rollers (e.g. more than 10) in order to distribute the weight of a heavy object over more rollers while incorporating a larger and more heavy-duty chassis. Or, in the alternative, the present invention can be made to simply incorporate more dollies linked to each other through use of the elongated members. Therefore, the present invention is capable of being used with just about any size or weight an object possesses.

Those skilled in the art will appreciate numerous variations in the present system, configuration and operation that are within the scope of the invention. Those skilled in the art will also appreciate how the principles illustrated in these preferred embodiments can be used in other examples of the invention. A particular reference number in one figure refers to the same element in all of the other figures.

Moreover, It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A reversible dolly apparatus for moving or retaining objects comprising: a plurality of dollies;
   the dolly comprising a chassis, at least two sets of rollers, at least two axles, and at least one elongate member;
   the chassis comprises a first side and a reversible side, an anterior end and a posterior end, at least six axle retaining members;
   the first side comprises a gondola channel, a first wall and a second wall, the gondola channel has a front end and a rear end, the front end of the gondola channel abuts with the first wall and the rear end abuts with the second wall;
   the reversible side comprises a substantially planar bearing surface for the purposes of bearing the load of an object;
   the first wall abuts with the anterior axle retaining members and the second wall abuts with the posterior retaining members; the anterior retaining members and posterior members comprise at least one orifice for the purpose of retaining an axle, the orifices are aligned with each other for the longitudinal placement of an axle therebetween;
   the rollers are disposed between the retaining members;
   the plurality of axles are disposed longitudinally through the rollers and the axle retaining members;
   the elongate member comprises a first end and a second end, a top side and a bottom side; the elongate member is disposed within the gondola channels between the walls of the dollies.

2. The reversible dolly apparatus of claim 1 further comprising a lazy susan plate for the purpose of swiveling an object, the lazy susan plate is disposed upon the reversible side of the plurality of dollies.

3. A reversible dolly apparatus for moving or retaining objects of claim 2 wherein the rollers are made of nylon.

4. The reversible dolly apparatus for moving or retaining objects of claim 3 further comprising at least one yoke, the yoke is disposed between a pair of retaining members.

5. The reversible dolly apparatus for moving or retaining objects of claim 4 further comprising steering bar for steering and pulling the dolly, the steering bar comprising a first end and a second end, the first end comprises a handle for a person for the purpose of a hand grip; the second end comprises a curved member for engaging the yoke.

6. The reversible dolly apparatus for moving or retaining objects of claim 5 wherein the steering bar is telescopic.

7. The reversible dolly apparatus for moving or retaining objects of claim 6 wherein the elongate member is made of wood.

8. A reversible dolly apparatus for moving or retaining objects comprising: a plurality of dollies;
   the dolly comprising a chassis, at least two sets of rollers, at least two axle assemblies, and at least one elongate member; a steering bar for steering and pulling the dollies, a lazy susan, the chassis comprises a first side and a reversible side, an anterior end and a posterior end, at least six axle retaining members;

the first side comprises a gondola channel, a first wall and a second wall, the gondola channel has a front end and a rear end, the front end of the gondola channel abuts with the first wall and the rear end abuts with the second wall;

the reversible side comprises a substantially planar bearing surface for the purposes of bearing the load of an object;

the first wall abuts with the anterior axle retaining members and the second wall abuts with the posterior retaining members; the anterior retaining members and posterior members comprise at least one orifice for the purpose of retaining an axle, the orifices are aligned with each other for the longitudinal placement of an axle therebetween;

the rollers are disposed between the retaining members;

the plurality of axles are disposed longitudinally through the rollers and the axle retaining members;

the elongate member comprises a first end and a second end, a top side and a bottom side;

the elongate member is disposed within the gondola channels between the walls of the dollies.

\* \* \* \* \*